(12) United States Patent
Florescu et al.

(10) Patent No.: US 11,741,642 B2
(45) Date of Patent: Aug. 29, 2023

(54) APPARATUS AND METHODS FOR NON-RECIPROCAL BROKEN RAY TOMOGRAPHY

(71) Applicant: University of Surrey, Guildford (GB)

(72) Inventors: Lucia Florescu, Guildford (GB); Vadim Markel, Philadelphia, PA (US); John C Schotland, Ann Arbor, MI (US)

(73) Assignee: University of Surrey, Guildford (GB)

( * ) Notice: Subject to any disclaimer, the term of this patent is extended or adjusted under 35 U.S.C. 154(b) by 370 days.

(21) Appl. No.: 16/927,183

(22) Filed: Jul. 13, 2020

(65) Prior Publication Data
US 2021/0012542 A1  Jan. 14, 2021

(51) Int. Cl.
*G06T 11/00* (2006.01)
*G06T 7/00* (2017.01)

(52) U.S. Cl.
CPC .......... *G06T 11/006* (2013.01); *G06T 7/0012* (2013.01); *G06T 11/005* (2013.01);
(Continued)

(58) Field of Classification Search
CPC ... G06T 11/006; G06T 7/0012; G06T 11/005; G06T 2211/424; G06T 2207/10081
See application file for complete search history.

(56) References Cited

U.S. PATENT DOCUMENTS 5,023,895 A * 6/1991 McCroskey .......... G01N 23/046
378/177
2011/0243299 A1 * 10/2011 Sugita ................... G01N 23/046
378/19
(Continued)

FOREIGN PATENT DOCUMENTS

EP  3082105 B1  11/2017

OTHER PUBLICATIONS

United Kingdom Intellectual Property Office, Search Report under Section 17(5), dated Jan. 13, 2020.

*Primary Examiner* — Vu Le
*Assistant Examiner* — Winta Gebreslassie
(74) *Attorney, Agent, or Firm* — Ryan Dean; Umberg Zipser LLP (57) ABSTRACT

Apparatus and methods for constructing a tomographic image of a sample are disclosed. The apparatus comprises at least one source configured to emit electromagnetic radiation at a first wavelength, at least one angularly-selective detector configured to detect the electromagnetic radiation at a second wavelength after the electromagnetic radiation has interacted with the sample, and a controller configured to construct a tomographic image of the sample based on information gathered using the at least one detector. The controller obtains information indicative of an intensity of the electromagnetic radiation detected at a second position by the at least one detector while the source is in a first position. Then, the source and detector positions are interchanged, and the controller obtains information indicative of an intensity of the electromagnetic radiation detected at the first position by the at least one detector while the electromagnetic radiation is emitted from the second position. By utilising the non-reciprocity of the broken ray transform, the controller can determine a first coefficient relating to an attenuation of the electromagnetic radiation in the sample at the first wavelength, a second coefficient relating to an attenuation of the electromagnetic radiation in the sample at the second wavelength, and a third coefficient relating to a material property that influences the intensity of the electromagnetic radiation measured by the at least one detector, and construct a tomographic image of the sample based on the determined first, second and third coefficients.

20 Claims, 3 Drawing Sheets

(52) U.S. Cl.
CPC ............... *G06T 2207/10081* (2013.01); *G06T 2211/424* (2013.01)

(56) References Cited

U.S. PATENT DOCUMENTS

| | | | |
|---|---|---|---|
| 2011/0274247 A1* | 11/2011 | Maschke | A61B 6/4441 378/62 |
| 2016/0120493 A1 | 5/2016 | Maeda et al. | |
| 2016/0313261 A1* | 10/2016 | Ronchi | G01N 23/046 |
| 2017/0248532 A1* | 8/2017 | Kadambi | H01J 35/065 |
| 2021/0327107 A1* | 10/2021 | Behrooz | G06T 11/006 |

\* cited by examiner

APPARATUS AND METHODS FOR NON-RECIPROCAL BROKEN RAY TOMOGRAPHY

TECHNICAL FIELD

The present invention relates to apparatus and methods for non-reciprocal broken ray tomography, including but not limited to x-ray tomography and optical tomography.

BACKGROUND

Tomography systems have been developed that allow the internal structure and composition of a sample to be studied through non-invasive means. For example, in the field of medicine, a patient may be injected with a fluorescent dye and scanned using electromagnetic radiation at a wavelength selected to cause fluorescence of the dye, to observe the condition of internal organs without the need for surgical intervention.

Tomography systems have been developed that make use of the so-called Broken Ray Transform (BRT). The BRT is defined in terms of integrals of a function (the attenuation coefficient) along two rays with a common vertex. The ray directions are fixed and determined by the directions of the source and detector, although the position of the vertex can be scanned over the plane that contains both rays.

The BRT is typically considered to be reciprocal, meaning that the transform is independent of the direction in which a photon travels along a given broken ray. Consequently, the associated measurements are independent of the interchange of the source and detector. However, in cases where the photon energy can change at the vertex of the ray, for example due to the photon being incoherently scattered or absorbed and then re-emitted, then reciprocity is lost. The loss of reciprocity complicates the process of image reconstruction in such cases.

SUMMARY OF THE INVENTION

According to a first aspect of the present invention, there is provided apparatus for constructing a tomographic image of a sample, the apparatus comprising: at least one source configured to emit electromagnetic radiation at a first wavelength; at least one angularly-selective detector configured to detect the electromagnetic radiation at a second wavelength after the electromagnetic radiation has interacted with the sample; and a controller configured to obtain information indicative of an intensity of the electromagnetic radiation detected at a second position by the at least one detector while the at least one source emits the electromagnetic radiation at a first position, and to obtain information indicative of an intensity of the electromagnetic radiation detected by the at least one detector after the source and detector positions are interchanged such that the electromagnetic radiation is emitted from the second position and detected at the first position, wherein said information is obtained for each one of a plurality of vertices within the sample, determine a first coefficient relating to an attenuation of the electromagnetic radiation in the sample at the first wavelength, a second coefficient relating to an attenuation of the electromagnetic radiation in the sample at the second wavelength, and a third coefficient relating to a material property that influences the intensity of the electromagnetic radiation measured by the at least one detector, based on said obtained information, and construct a tomographic image of the sample based on the determined first, second and third coefficients.

In some embodiments according to the first aspect, the apparatus is configured to interchange the source and detector positions by physically moving the at least one source and the at least one detector.

In some embodiments according to the first aspect, the at least one source comprises a first source arranged to emit the electromagnetic radiation from the first position and a second source arranged to emit the electromagnetic radiation from the second position, and the apparatus is configured to interchange the source and detector positions by controlling the first source to stop emitting electromagnetic radiation and controlling the second source to start emitting electromagnetic radiation.

In some embodiments according to the first aspect, the first wavelength is an x-ray wavelength and the third coefficient is a scattering coefficient related to an electron density of the sample at the respective one of the plurality of vertices.

In some embodiments according to the first aspect, the at least one detector is arranged so as to detect the electromagnetic radiation at an angle of about 120 degrees relative to a direction in which the electromagnetic radiation is emitted by the at least one source.

In some embodiments according to the first aspect, the at least one detector comprises: a first detector arranged so as to detect the electromagnetic radiation at an angle of about 120 degrees relative to the direction in which the electromagnetic radiation is emitted by the source; and a second detector arranged so as to detect the electromagnetic radiation at an angle of about 120 degrees relative to the direction in which the electromagnetic radiation is emitted by the at least one source, and at an angle of about 120 degrees relative to the angle at which the first detector is arranged to detect the electromagnetic radiation.

In some embodiments according to the first aspect, the first wavelength is an optical wavelength and the third coefficient is related to a concentration of a fluorescent dye at the respective one of the plurality of vertices.

In some embodiments according to the first aspect, the controller is configured to cause the tomographic image to be displayed on a display.

In some embodiments according to the first aspect, the apparatus comprises the display, configured to receive the tomographic image from the controller and display the tomographic image.

In some embodiments according to the first aspect, the apparatus comprises a source positioning mechanism for automatically moving the at least one source between a plurality of source positions, and a detector positioning mechanism for automatically moving the at least one detector between a plurality of detector positions.

In some embodiments according to the first aspect, after obtaining the information indicative of an intensity of the electromagnetic radiation detected at the second position by the at least one detector while the electromagnetic radiation is emitted from the first position, the controller is configured to control the source and detector positioning mechanisms to interchange the positions of the source and at least one detector, and then obtain the information indicative of an intensity of the electromagnetic radiation detected at the first position by the at least one detector while the electromagnetic radiation is emitted from the second position.

In some embodiments according to the first aspect, the at least one source is configured to emit the electromagnetic radiation along a first axis, and the controller is configured to obtain the information indicative of the intensity of the electromagnetic radiation detected by the at least one detector for a slice through the sample by: controlling the detector positioning mechanism to scan the at least one detectors along a second axis at an angle with respect to the first axis; and controlling the detector positioning mechanism to scan the at least one detectors along a third axis at an angle with respect to the first and second axes.

In some embodiments according to the first aspect, the tomographic image is a three-dimensional image of the sample, and the controller is configured to obtain the information indicative of the intensity of the electromagnetic radiation detected by the at least one detector for a plurality of slices by: controlling the source positioning mechanism to move the at least one source to a new source position offset from the first axis on which electromagnetic radiation was emitted at the previous source position; controlling the detector positioning mechanism to scan the at least one detectors along the first and second axes so as to obtain said information for a new slice containing the new source position; and repeating said steps of controlling the source and detector positioning mechanisms to obtain said information for the plurality of slices.

In some embodiments according to the first aspect, the controller is configured to determine the first coefficient, $\mu_e(r)$, and the second coefficient, $\mu_f(r)$, based on solving the simultaneous equations:

$$\overline{\mu}(r) = \frac{1}{2}[\mu_e(r) + \mu_f(r)],$$

$$\Delta(r) = \mu_e(r) - \mu_f(r).$$

where $$\overline{\mu}(r) = -\frac{1}{\sigma}\nabla \cdot \Phi^{(+)}(r)$$

and $$\Delta(r) = -\frac{1}{\sigma}\nabla \cdot \Phi^{(-)}(r)$$

where $\Phi^{(+)}(r)$ is a linear combination of symmetric data functions relating to a sum of the intensities of the electromagnetic radiation detected by the at least one detector, $\Phi^{(-)}(r)$ is a linear combination of anti-symmetric data functions relating to a difference between the intensities of the electromagnetic radiation detected by the at least one detector, and a is a predefined quantity relating to a geometric arrangement of the source and detector positions, and wherein the controller is configured to determine the third coefficient $\xi(r)$ based on the equation $$I_k^{(+)}(r) + I_l^{(+)}(r) + \xi(r) = \phi_{kl}^{(+)}(r)$$

where $$I_k^{(+)}(r) = \int_0^\infty \overline{\mu}(r + \hat{u}_k l) dl$$

and wherein $\phi_{kl}^{(+)}(r)$ are symmetric data functions relating to the sum of the intensities of the electromagnetic radiation detected by the at least one detector.

According a second aspect of the present invention, there is provided a method of constructing a tomographic image of a sample using apparatus comprising at least one source configured to emit electromagnetic radiation at a first wavelength, and at least one angularly-selective detector configured to detect the electromagnetic radiation at a second wavelength after the electromagnetic radiation has interacted with the sample, the method comprising: obtaining information indicative of an intensity of electromagnetic radiation detected at a second position by at least one detector while at least one source emits the electromagnetic radiation at a first position, for each one of a plurality of vertices within the sample; obtaining information indicative of an intensity of the electromagnetic radiation detected by the at least one detector after the source and detector positions are interchanged such that the electromagnetic radiation is emitted from the second position and detected at the first position, for each one of the plurality of vertices within the sample; determining an attenuation coefficient of the sample at the first wavelength, an attenuation coefficient of the sample at the second wavelength, and a material property that influences the intensity of the electromagnetic radiation measured by the at least one detector, based on said obtained information; and constructing a tomographic image of the sample based on the determined first, second and third coefficients.

According a third aspect of the present invention, there is provided a computer program comprising software instructions which, when executed, cause performance of a method according to the second aspect.

According a fourth aspect of the present invention, there is provided a non-transitory computer-readable medium arranged to store a computer program according to the third aspect.

BRIEF DESCRIPTION OF THE DRAWINGS

Embodiments of the present invention will now be described, by way of example only, with reference to the accompanying drawings, in which.

DETAILED DESCRIPTION

In the following detailed description, only certain exemplary embodiments of the present invention have been shown and described, simply by way of illustration. As those skilled in the art would realise, the described embodiments may be modified in various different ways, all without departing from the scope of the present invention. Accordingly, the drawings and description are to be regarded as illustrative in nature and not restrictive. Like reference numerals designate like elements throughout the specification.

Figure 1:
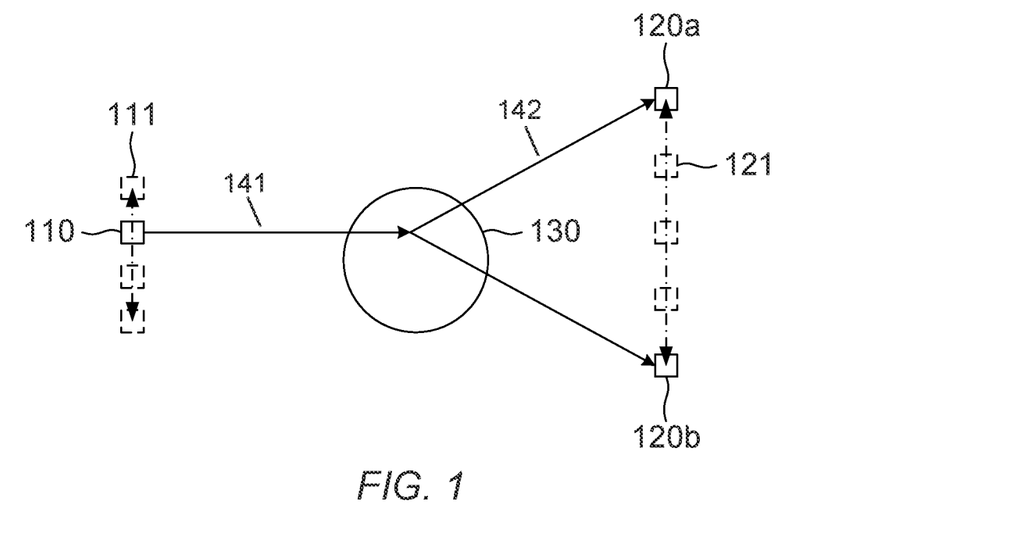
FIG. 1 illustrates a source and detector arrangement for capturing an x-ray or optical tomography image of a sample, according to an embodiment of the present invention.

Referring now to FIG. 1, a source and detector arrangement for capturing a tomography image of a sample is illustrated, according to an embodiment of the present invention. The apparatus comprises a source 110, a first detector 120a and a second detector 120b. The first detector 120a and the second detector 120b are angularly-selective detectors, meaning that the first and second detectors 120a, 120b are each configured to detect electromagnetic radiation which arrives at the detector 120a, 120b at a certain incident angle. It will be appreciated that in practice, each detector 120a, 120b may be sensitive to electromagnetic radiation at a narrow range of incident angles, as opposed to only detecting radiation at a single finite angle. Examples of angularly-selective detectors are known in the aft, and any suitable type of angularly-selective detector may be used in embodiments of the present invention.

The source 110 is configured to emit electromagnetic radiation 141 with a wavelength in the x-ray or optical ranges of wavelengths. For example, in an embodiment in which x-ray electromagnetic radiation is used, the wavelength of electromagnetic radiation emitted by the source 110 may be between 0.01 and 10 nanometres (nm). The source 110 is configured to emit electromagnetic radiation 141 having a single wavelength, and so may be referred to as a 'monochromatic source' 110 or a 'single-energy source'. It will be appreciated that in practice, any given source may emit electromagnetic radiation with a narrow range of wavelengths as opposed to a single finite wavelength, and references to 'monochromatic source' or 'single-energy source' herein should be construed accordingly. The first and second detectors 120a, 120b are disposed on an opposite side of the sample 130 to the source 110, such that the detectors 120a, 120b can detect the electromagnetic radiation 142 after it has passed through the sample 130.

The source 110 is configured to be moveable between a plurality of source positions 111. Similarly, the first and second detectors 120a, 120b are each configured to be moveable between a plurality of detector positions 121. The apparatus may comprise mechanisms for automatically moving the source 110 and the first and second detectors 120a, 120b to respective ones of the source positions in and detector positions 121 during the process of capturing data for reconstructing a tomographic image of the sample 130. Examples of suitable mechanisms for positioning sources and detectors in tomography systems are known in the aft, and a detailed description will not be provided here so as to avoid obscuring the present inventive concept.

The first detector 120a and the second detector 120b are each configured to detect the electromagnetic radiation 142 along the corresponding directions after the beam of electromagnetic radiation 142 has interacted with the sample 130. The electromagnetic radiation 142 that reaches the first and second detectors 120a, 120b has a second wavelength which is different to the first wavelength of the electromagnetic radiation originally emitted by the source 110. In an x-ray tomography embodiment, the change of wavelength from the first to the second wavelength occurs as a result of an energy change due to Compton scattering, and accordingly the first and second detectors 120a, 120b are arranged at angles of 120° with respect to the direction of the beam emitted by the source 110. However, in an optical tomography embodiment the first and second detectors 120a, 120b may be arranged at any angles with respect to the source 110.

In an optical tomography embodiment in which a fluorescent dye is used, the change of wavelength from the first to the second wavelength occurs as a result of dye fluorescence in the sample 130. In some embodiments the first and second detectors 120a, 120b are each configured to detect electromagnetic radiation 142 at the second wavelength without detecting electromagnetic radiation at other wavelengths, and so may be referred to as 'single-energy' detectors. It will be appreciated that any given single-energy detector may in practice be sensitive to electromagnetic radiation over a certain limited range of wavelengths, and references to a 'single-energy detector' herein should be construed accordingly. In other embodiments, some or all of the detectors used may be capable of detecting electromagnetic radiation across a wide range of wavelengths. In such embodiments, a suitable filter (e.g. an optical filter) may be disposed between the detector and the sample so as to block electromagnetic radiation at other wavelengths (i.e. other than the second wavelength) from reaching the detector.

In the present embodiment, the source 110, the first detector 120a, and the second detector 120b are disposed in the same plane at angles of 120° around a vertex, as shown in FIG. 1. In some embodiments, the apparatus may only comprise a single detector. However, providing a plurality of detectors as shown in FIG. 1 offers an advantage over a single detector, by reducing the time taken to acquire a full set of data.

The first and second detectors 120a, 120b are configured to output information indicative of the intensity of the electromagnetic radiation 142 that emerges from the sample 130 along the corresponding directions of the first and second detectors 120a, 120b at the second wavelength, after the electromagnetic radiation has interacted with the sample 130. The intensity of the electromagnetic radiation 142 measured at the first and second detectors 120a, 120b, together with knowledge of the geometry of the system, can be used to derive information about the internal structure of the sample 130. By moving the source 110 and the detectors 120a, 120b between the plurality of source positions in and detector positions 121, and by interchanging the positions of the source 110 and detectors 120a, 120b, data may be captured from a volume of the sample 130 enabling a tomographic image to be constructed showing the internal structure of the sample.

The form in which information is outputted by the first and second detectors 120a, 120b may depend on the type of detectors used. For example, the first and second detectors 120a, 120b may be analogue detectors configured to output an analogue signal with a voltage level that is proportional to the measured intensity of electromagnetic radiation. Alternatively, the first and second detectors 120a, 120b may be digital detectors configured to output a digital codeword representing the measured intensity. In some embodiments a combination of analogue and digital detectors 120a, 120b may be used in the same apparatus.

Figure 2:
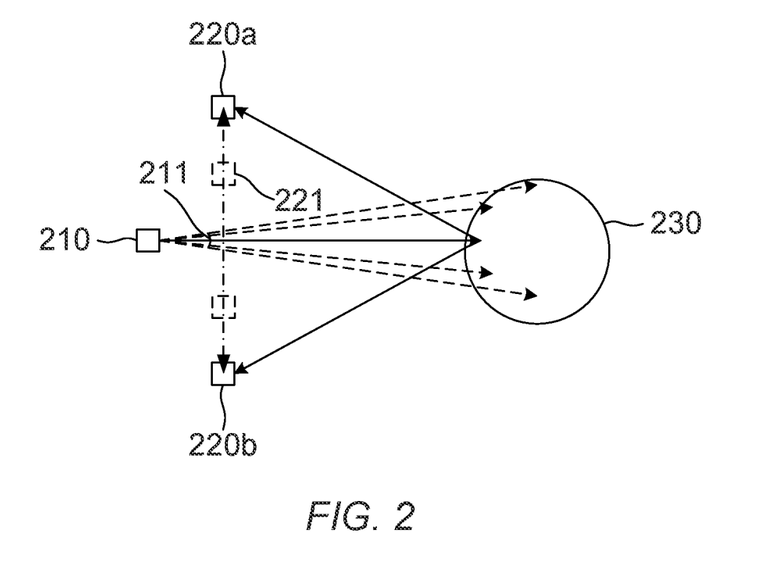
FIG. 2 illustrates a source and detector arrangement for capturing an optical tomography image of a sample, according to an embodiment of the present invention.

Referring now to FIG. 2, a source and detector arrangement for capturing an optical tomography image of a sample is illustrated, according to an embodiment of the present invention. Like the apparatus of FIG. 1, the apparatus of the present embodiment comprises at least one source 210, a first detector 220a and a second detector 220b. Also, as with the embodiment of FIG. 1, the at least one source 210 is configured to emit electromagnetic radiation having a first wavelengths, and the first and second detectors 220a, 220b are configured to detect the electromagnetic radiation at the second wavelengths after interaction with the sample 230 that emerges from the sample 230 along the corresponding directions of the first and second detectors 220a, 220b. In the present embodiment, the detected electromagnetic radiation has a different wavelength to the emitted radiation due to fluorescence in the sample 230.

For the sake of brevity, a detailed description of features common to both the x-ray embodiment of FIG. 1 and the optical embodiment of FIG. 2 will not be repeated here. As shown in FIG. 2, the system geometry in the optical embodiment differs from the geometry in the x-ray embodiment of FIG. 1 since electromagnetic radiation at optical wavelengths may not penetrate as far into the sample 230 in some applications. As such, in the present embodiment the first and second detectors 220a, 220b are disposed on the same side of the sample 230 as the source 210.

Figure 3:
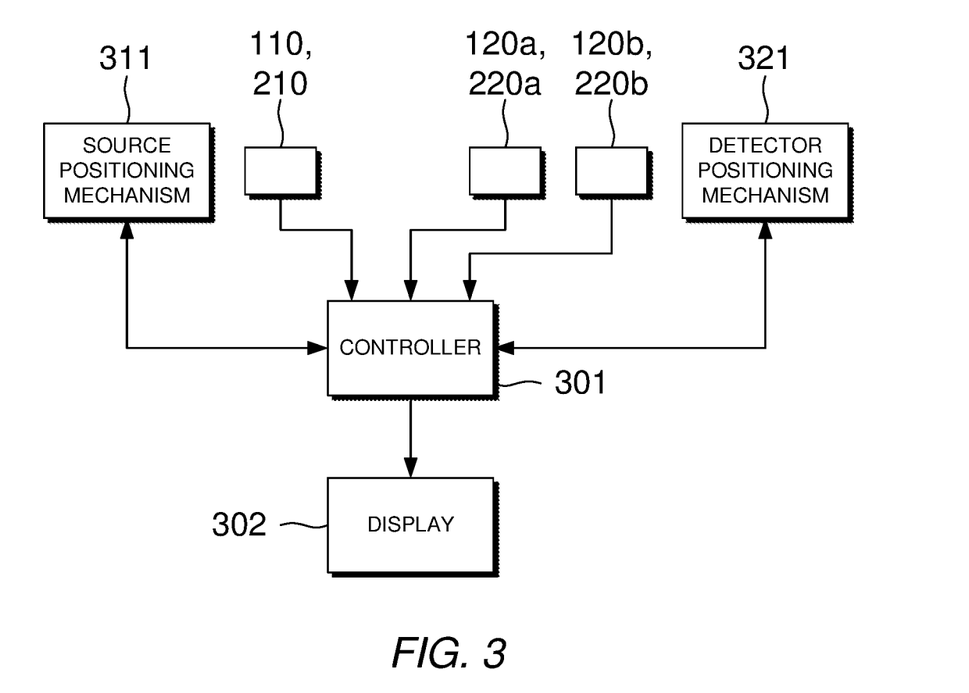
FIG. 3 illustrates a tomographic imaging apparatus for constructing a tomographic image of a sample, according to an embodiment of the present invention.

Referring now to FIG. 3, a tomographic imaging apparatus for constructing a tomographic image of a sample is illustrated, according to an embodiment of the present invention. The apparatus can obtain data using the source-detector geometries illustrated in FIGS. 1, if an x-ray source and detectors are used, or either of the source-detector geometries illustrated in FIGS. 1 and 2, if an optical source and detectors are used, depending on the particular application. As described above, the apparatus comprises at least one source 110, 210 and at least one detector 120a, 120a, 220a, 220b. The apparatus also comprises a controller 301, a display 302, a source positioning mechanism 310, and a detector positioning mechanism 320. The controller 301 is configured to receive data from the first and second detectors Depending on the embodiment, any of the source 110, 210, detector 120a, 120a, 220a, 220b, controller 301, display 302, source positioning mechanism 310, and detector positioning mechanism 320 may be embodied in the same physical device, or may be in physically separate devices. For example, in one embodiment the controller 301 and the display 302 may be physically separate from the source 110, 210, detector 120a, 120a, 220a, 220b, source positioning mechanism 310, and detector positioning mechanism 320. In such an embodiment, the controller 301 may transmit commands to the source positioning mechanism 310, and detector positioning mechanism 320 and receive data from the at least one detector 120a, 120a, 220a, 220b over any suitable wired or wireless communication interface or interfaces.

The source positioning mechanism 310 is configured to be responsive to commands received from the controller 301 so as to automatically move the source 110, 120 to respective ones of the source positions 111, 121 during the process of capturing data for reconstructing a tomographic image of the sample 130, 230. Similarly, the detector positioning mechanism 320 is configured to be responsive to commands received from the controller 301 so as to automatically move the first and second detectors 120a, 120b, 220a, 220b to respective ones of the detector positions 121, 221.

In the present embodiment, the controller 301 is configured to control the detector positioning mechanism 320 to move the first and second detectors 120a, 220a, 120b, 220b to each of the plurality of detector positions 121, 221 in turn, while keeping the source 110, 210 position constant. For example, each detector position 121, 221 may correspond to a different position along the vertical axis in the orientation shown in FIGS. 1 and 2, which may be denoted as the z-axis. At each detector position 121, 221, the controller 301 can record data received from the first and second detectors 120a, 220a, 120b, 220b before moving the first and second detectors 120a, 220a, 120b, 220b to the next detector position 121, 221. The controller 301 may comprise one or more processors and memory arranged to store computer program instructions which, when executed by the one or more processors, cause the controller 301 to perform the actions described herein.

As described above, the first and second detectors 120a, 220a, 120b, 220b are angularly-selective detectors, meaning that each detector only detects electromagnetic radiation which arrives at the detector from a certain incident angle. Consequently, by scanning the detectors 120a, 120b, 220a, 220b vertically, the detectors 120a, 120b, 220a, 220b can sample rays that originate from different points along the path of the ray emitted by the source 110, 210. In this way, data can be collected for a plurality of vertices along the path of the ray emitted by the source 110, 210, which in FIGS. 1 and 2 are shown as travelling in the horizontal direction. Moving the detectors 120a, 120b, 220a, 220b vertically therefore has the effect of capturing data along the horizontal axis of the beam 1 41, 241 emitted by the source 110, 210.

A three dimensional tomographic image can be reconstructed by capturing data in many parallel two-dimensional transverse slices. To acquire information for such two-dimensional 'slices' through the sample 130, 230, the source 110, 210 and the detectors 120a, 120b, 220a, 220b may also be scanned in synchronisation with one another along an axis normal to the plane of the drawings in FIGS. 1 and 2. Here, by 'synchronisation' it is meant that the source 110, 120 and the detectors 120a, 120b, 220a, 220b are all moved in or out of the plane by the same amount. In other embodiments, the detectors 120a, 120b, 220a, 220b may be scanned along non-orthogonal axes during the process of scanning a three-dimensional volume of the sample 130, 230.

Once data has been recorded for all detector positions 121, 221 at a given source position, the controller 301 is configured to control the source positioning mechanism 310 to move the source 110, 210 to another one of the source positions 111, 211 in order to target the beam of electromagnetic radiation 141, 241 at a different part of the sample 130, 230, and then repeat the process of moving the detectors 120a, 120b, 220a, 220b to all of the detector positions 121, 221 in turn to capture data relating to the new part of the sample 130, 230. The controller 301 repeats the process until data has been captured for all combinations of source positions 111, 121 and detector positions 121, 221.

In this way, the controller 301 can capture data relating to the same part of the sample 130, 230 from all of the plurality of detector positions 121, 221 in the shortest possible time frame, reducing the likelihood of errors due to movement of the sample 130, 230 while the data is being captured. However, in other embodiments the controller 301 could move the source 110, 210 while keeping the positions of the first and second detectors 120a, 120b, 220a, 220b fixed, and then move the first and second detectors 120a, 120b, 220a, 220b to a different detector position 21, 221 once data has been captured for all source positions 111, 211 at the previous detector position 121, 221.

Methods by which the controller 301 can process data received from the first and second detectors 120a, 120b, 220a, 220b in order to derive information about the internal structure of the sample 130, 230 will now be described in more detail. Although described in relation to tomographic optical fluorescence imaging using a sensor and detector geometry as shown in FIG. 2, it should be appreciated that embodiments of the invention are also applicable to other types of tomographic imaging. For example, the results described below are also applicable to inverting broken ray transforms (BRTs) that arise due to single Compton scattering, and consequently are applicable to x-ray tomography embodiments using a source-detector geometry as shown in FIG. 1.

Figure 5:
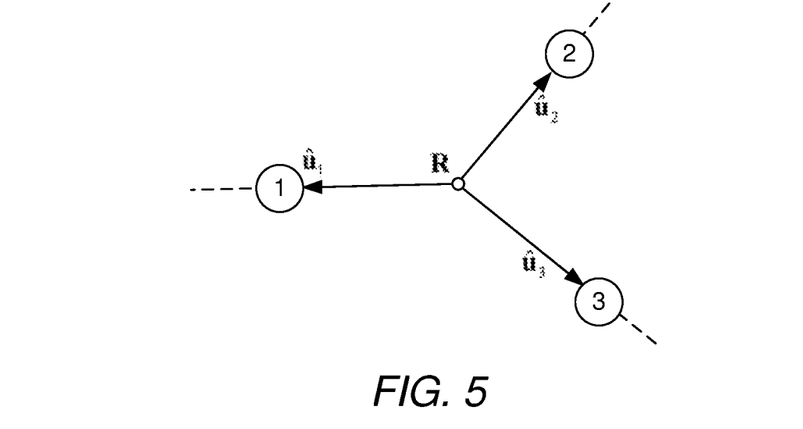
FIG. 5 illustrates the imaging geometry for the case of three rays, according to an embodiment of the present invention.

By reversing the path of a photon and using the non-reciprocity of the data function, optical properties such as the intrinsic attenuation coefficients of the sample 230 at the excitation and the fluorescence frequency, and the concentration of a contrast agent (e.g. a fluorescent dye), can be simultaneously and independently reconstructed. In practice, the path of the photon can be reversed by swapping the source and the detector positions. For example, FIG. 5 illustrates three possible source positions in an embodiment similar to the one shown in FIG. 1, in which one source and two detectors are used. The controller 301 can record information indicative of the intensity of electromagnetic radiation having the second wavelength as measured by the two detectors 120a, 120b while the source 110 is at position '1', the first detector 120a is at position '2', and the third detector 120b is at position '3'. Next, the controller 310 can control the source and detector positioning mechanisms 310, 320 to move the source 110 to position '2' and move the first detector 120a to position '1', while keeping the second detector 120b at position '3', and record information indicative of the intensity of electromagnetic radiation having the second wavelength as measured by the two detectors 120a, 120b for the new source and detector positions. Then, the controller 310 can control the source and detector positioning mechanisms 310, 320 to move the source 110 to position '3' and move the second detector 120b to position '2', while keeping the first detector 120a at position '1', and record information indicative of the intensity of electromagnetic radiation having the second wavelength as measured by the two detectors 120a, 120b for the new source and detector positions. In the present embodiment the first and second detectors 120a, 120b are identical detectors, and so it will be appreciated that for each combination of source and detector positions the positions of first and second detectors 120a, 120b may be interchanged without affecting the results.

In the following disclosure, we consider a non-reciprocal BRT applicable to the problem of fluorescence imaging in a sample 230 comprising a weakly-scattering or non-scattering medium. In this case, the photon travels along a line until it is absorbed by a fluorophore molecule and then is re-emitted in a different direction and at a different frequency, which is generally lower than the original frequency. The non-reciprocity of the BRT allows additional information about the medium to be determined by interchanging the source and detector in each pair. In particular, this approach allows the attenuation coefficients of the medium at both the excitation and the fluorescence frequencies to be reconstructed independently, as well as the concentration of the fluorophore. The method described below requires doubling the number of physical measurements, but does not involve any assumptions about the spectral dependence of the attenuation coefficient, which can generally differ at different points in the medium.

The method described below is also applicable to embodiments in which x-ray imaging is used. In the case of x-ray imaging, the photon can change its direction due to Compton scattering, which also results in a reduction of the photon energy. Since the attenuation coefficient can depend on energy, this poses an additional challenge. Prior art solutions to this problem typically rely on the assumption that the spectral dependence of the attenuation coefficient is linear. However, as described below, the inventors have shown that by using imaging geometries in which the scattering angles and hence the Compton energy shifts are the same, for example the three-ray star geometry shown in FIG. 5, it is possible to account for the non-reciprocity of the measurements without the need to make assumptions about the spectral dependence of the attenuation.

Forward Problem

In this section, we consider the coupled transport equations and show that, in a non-scattering o r a weakly-scattering medium, the specific intensity of light at the fluorescence frequency due to a collimated incident beam at the excitation frequency is mathematically related to a BRT of the medium.

Figure 6:
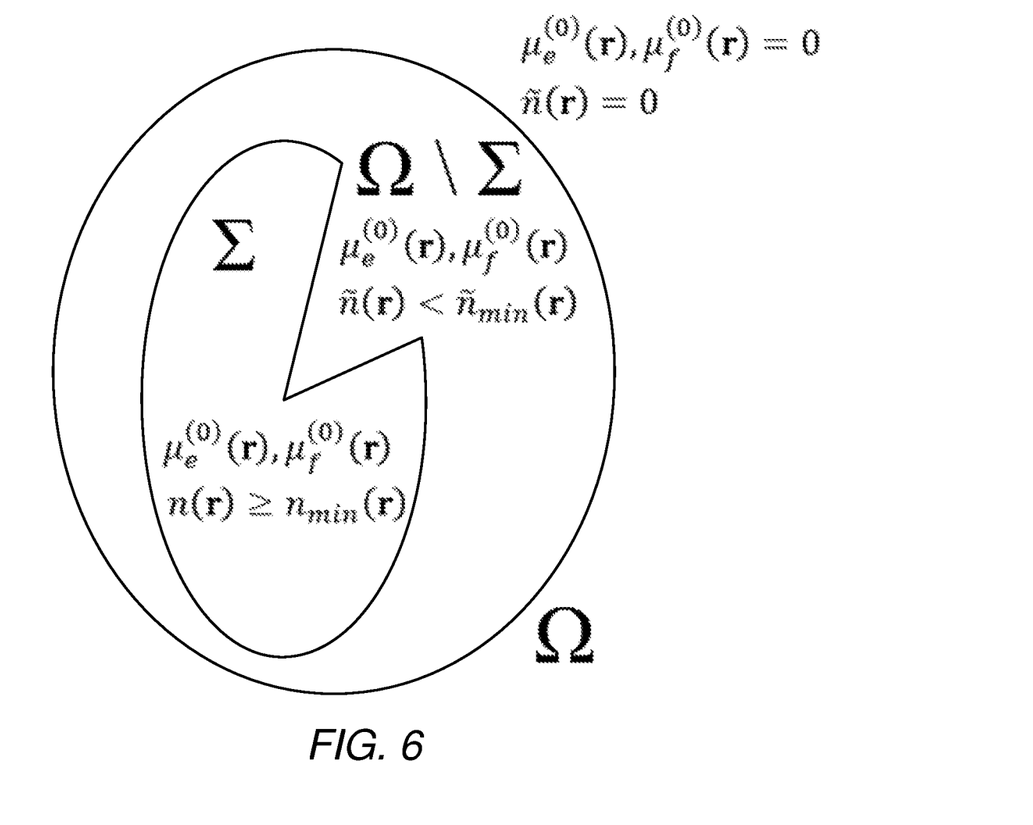
FIG. 6 illustrates the domains in which image reconstruction is performed, according to an embodiment of the present invention.

We begin by considering the physical problem of fluorescence imaging in a weakly-scattering or non-scattering medium, for example the sample 230 shown in FIG. 2, which can be taken to be a three-dimensional bounded domain $\Omega$ as shown in FIG. 6. In the present embodiment, the electromagnetic radiation 241, 242 comprises light at visible wavelengths, and hence references to 'light' in the following description should be construed accordingly as referring to either the electromagnetic radiation 241 emitted by the source 210, or the electromagnetic radiation 242 detected by the first or second detector 220a, 220b, depending on the context.

In the absence of scattering, the transport equations describing the propagation of the electromagnetic radiation 241, 242 at the excitation and fluorescent frequencies (distinguished by the subscripts e and f, respectively) are of the form $$[\hat{s}\cdot\nabla+\mu_e(r)]I_e(r,\hat{s})=0, \tag{1a}$$

$$[\hat{s}\cdot\nabla+\mu_f(r)]I_f(R,\hat{s}). \tag{1b}$$

Here, $I_e(r,\hat{s})$, $I_f(r,\hat{s})$ are the specific intensities of light at the position r in the direction $\hat{s}$, $\mu_e$, $\mu_f$ are the attenuation coefficients of the medium in the sample 230 at the excitation and fluorescent frequencies respectively, as indicated by the subscripts e and f, and S is the fluorescent source. Equations (1a) and (1b) are also supplemented by the half-range boundary conditions as follows:

$$I_e(r,\hat{s})=I_{inc}(r,\hat{s}) \text{ and } I_f(r,\hat{s})=0 \text{ for } \hat{s}\cdot\hat{n}(r)<0, r\in\partial\Omega, \tag{2}$$

where $\hat{n}$ is the outward unit normal to $\partial\Omega$ and $I_{inc}$ is the incident specific intensity at the excitation frequency. Note that no light at the fluorescent frequency enters the sample 230 except due to the source S, which is defined below. For a sample 230 containing fluorescent molecules of the number density n(r), we can write $$\mu_e(r)=\mu_e^{(0)}(r)+\sigma_e n(r), \tag{3a}$$

$$\mu_f(r)=\mu_f^{(0)}(r)+\sigma_f n(r), \tag{3b}$$

where $\mu_e^{(0)}(r)$ and $\mu_f^{(0)}(r)$ are the intrinsic (background) attenuation coefficients of the medium and $\sigma_e$, $\sigma_f$ are the absorption cross sections of the fluorescent molecules at the frequencies indicated by the subscripts. The cross sections are assumed to be known from spectroscopic measurements and it is expected that $\sigma_f<\sigma_e$. The source function at the fluorescence frequency is given by $$S(r,\hat{s})=\frac{\eta\sigma_e}{4\pi}n(r)u_e(r), \tag{4}$$

where $\eta$ is the quantum efficiency of the fluorophores and the energy density $u_e(r)=\int I_e(r,\hat{s})d^2s$. If the incident light 242 is injected into the sample 230 by the source 210 as a narrow collimated beam, then:

$$u_e(r)=\frac{W}{|r-r_1|^2}\exp\left(-\int_{r_1}^{r}\mu_e d\ell\right)\delta\left(\hat{s}_1-\frac{r-r_1}{|r-r_1|}\right). \tag{5}$$

Here $r_1$, and $s_1$ are the location and direction of the source 210, W is the source 210 power, and $\int_a^b fdl$ is the integral of f along the line connecting the two points a and b.

Let the specific intensity at the fluorescence frequency be measured at the point $r_2 \in \delta\Omega$ and in the direction $\hat{s}_2$. Then it follows from (1b) that $$I_f(r_2, \hat{s}_2) = \frac{\eta \sigma_e W}{4\pi} \int d^3r \frac{n(r)u_e(r)}{|r_2 - r|^2} \exp\left(-\int_r^{r_2} \mu_f d\ell\right) \delta\left(\hat{s}_2 - \frac{r - r_2}{|r - r_2|}\right) \quad (6)$$

where we have accounted for the isotropy of the source function S. This leads to the final result, $$I_f(r_2, \hat{s}_2) = \frac{\eta \sigma_e W}{4\pi r_{21} \sin\theta_1 \sin\theta_2} \quad (7)$$

$$\exp\left(-\int_{r_1}^R \mu_e d\ell - \int_R^{r_2} \mu_f d\ell\right) \times n(R) \Theta(\pi - (\theta_1 + \theta_2)) \delta(\varphi_2 - \pi).$$

Figure 4:
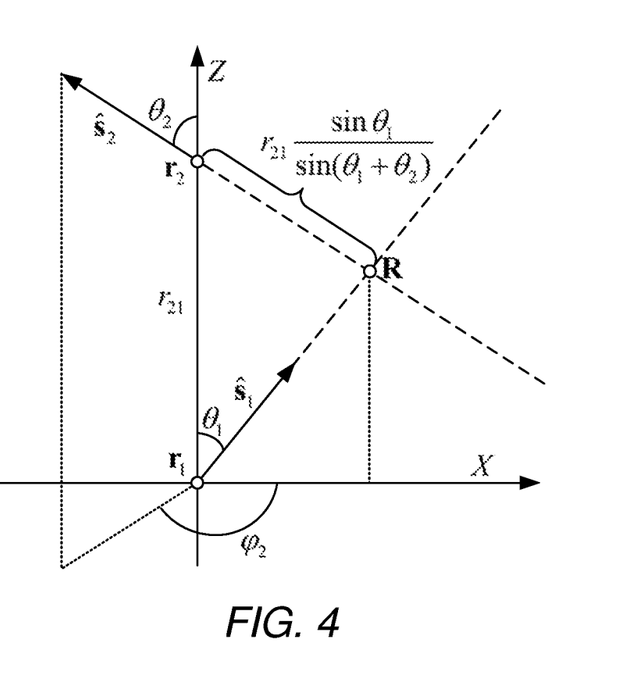
FIG. 4 illustrates the geometry of a ray interacting with part of a sample, according to an embodiment of the present invention.

Various geometrical quantities and objects appearing in equation (7) are illustrated in
FIG. 4. In particular, $$r_{21} = r_2 - r_1, \quad R = r_2 - r_{21} \frac{\sin\theta_1}{\sin(\theta_1 + \theta_2)} \hat{s}_2$$

is the position of the vertex, that is, the point where the two rays shown in FIG. 4 by the dashed lines intersect, $\Theta(\cdot)$ is the unit step function, and we have assumed that the vectors $r_{21}$ and $\hat{s}_1$ lie in the XZ plane of the laboratory frame. The delta-function $\delta(\varphi_2 - \pi)$ ensures that $\hat{s}_2$ lies in the same plane. Therefore, equation (7) yields a nonzero result only if the three vectors $r_{21}$, $\hat{s}_1$ and $\hat{s}_2$ lie in the same plane, which defines the slice of the medium 230 in which the two-dimensional reconstruction of $\mu_e^{(o)}(r)$, $\mu_f^{(o)}(r)$ and $n(r)$ is performed. Finally, the function $\Theta(\pi - \theta_1 + \theta_2)$ is equal to unity if the vertex exists, and is equal to zero otherwise. When experimental data are used, accounting for the geometrical factor $1/r_{21} \sin\theta_1 \sin\theta_2$ in equation (7) is important for correct formulation of the inverse problem.

Data Function

In this section, the data function to be used in the reconstruction of the functions of interest is defined. Here, the goal is to reconstruct the three functions $\mu_e^{(o)}(r)$, $\mu_f^{(o)}(r)$ and $n(r)$ separately from collimated boundary measurements of the fluorescence intensity. In an experiment, the latter function $n(r)$ can be registered with the use of a spectral filter that excludes all electromagnetic radiation at the excitation frequency $f_e$.

To proceed, it is convenient to introduce the dimensionless concentration of fluorophores according to $\tilde{n}(r) = \eta \sigma_e^{3/2} n(r)$. We note that $\tilde{n} \sim 1$ corresponds to a very high concentration and, in practice, we expect that $\tilde{n} \ll 1$ will hold. Assuming that the condition $\theta_1 + \theta_2 < \pi$ holds so that the vertex exists, then:

$$\frac{\sqrt{\sigma_e} \, r_{21}}{W} I_f(r_2, \hat{s}_2) = \quad (8)$$

$$\frac{\tilde{n}(R)}{4\pi \sin\theta_1 \sin\theta_2} \exp\left(-\int_{r_1}^R \mu_e d\ell - \int_R^{r_2} \mu_f d\ell\right) \delta(\varphi_2 - \pi).$$

Both sides of this equation are dimensionless. However, the expression is still singular and not amenable to direct interpretation as a measurable signal. This problem can be addressed by noting that the fluorescence intensity at the point of observation $r_2$ depends on the spherical coordinates of the unit vector $\hat{s}_2$, $\theta_2$ and $\Phi_2$. The dependence on $\theta_2$ is slow ($1/\sin\theta_2$) while the dependence on $\varphi_2$ is fast and expressed mathematically by the delta-function $\delta(\varphi_2 - \pi)$. On the other hand, all physical detectors measure the specific intensity in some finite solid angle. As described above in relation to FIGS. 1 and 2, in embodiments of the present invention the first and second detectors 120a, 120b, 220a, 220b are angle-selective detectors.

Assuming that the measured quantity is $\int_{\pi-\delta}^{\pi+\delta} I_f d\varphi_2$, where $\delta$ is a small angle, the data function $\varphi_{12}(R)$ can be defined as follows:

$$\phi_{12}(R) = -\log\left[4\pi \sin\theta_1 \sin\theta_2 \frac{\sqrt{\sigma_e} \, r_{21}}{W} \int_{\pi-\delta}^{\pi+\delta} I_f(r_2, \hat{s}_2) d\varphi_2\right]. \quad (9)$$

Let $\hat{s}_1$ and $\hat{s}_2$ be fixed such that the vertex exists. Then there is a one-to-one correspondence between the position of the vertex R and the pair of variables $(r_1, r_2)$. Viewing R as the independent variable, and applying the definition in equation (9) to equation (8), the following result can be obtained:

$$I_{e,1}(R) + I_{f,2}(R) + \xi(R) = \phi_{12}(R), \quad (10)$$

where $$\xi(R) = -\log[\tilde{n}(R)], \quad (11a)$$

$$I_{e,1}(R) = \int_0^\infty \mu_e(R - \hat{s}_1 l) dl, \quad (11b)$$

$$I_{f,2}(R) = \int_0^\infty \mu_f(R + \hat{s}_2 l) dl. \quad (11c)$$

In equations (10) to (11c), it is assumed that $\mu_e(r)$ and $\mu_f(r)$ are supported in $\Omega$ so that the ray integrals can be extended to infinity. It can be noted that the data function can be measured only for such positions of the vertex R that $n(R) \neq 0$. If $\tilde{n}(R) = 0$, the measured fluorescence intensity is zero, at least, within the approximation used here, and the logarithm in (9) is undefined.

Inverse Problem

The following description explains how the BRT non-reciprocity can be used to formulate the inverse problem. In the previous sections, the case of one broken ray defined by the locations of the source and detector ($r_1$ and $r_2$) and the location of the vertex r has been considered. Hereinafter, the vertex position is denoted by the small letter r. In this section, a more general arrangement of source-detector pairs is allowed, with the assumption that all broken rays corresponding to different source-detector pairs have the same vertex and that this vertex can be scanned with a reasonable spatial resolution over the sub-region of $\Omega$ in which $\tilde{n}(r) > 0$. Some of the broken rays in a given 'star' can have a common edge. The imaging geometry is sketched in FIG. 5, where $\hat{u}_k$ are unit vectors pointing from the vertex to a source or detector. It can be noted that $\hat{u}_k = \pm \hat{s}_k$, where the plus sign must be chosen if the ray points towards a detector and the minus sign is chosen if the ray points towards a source.

The generalization of equation (10) to the above case is the N-ray star transform equation:

$$I_{e,k}(r) + I_{f,l}(r) + \xi(r) = \phi_{kl}(r), k, l = 1, \ldots, N, k \neq l, \quad (12)$$

Here, $$I_{e,k}(r)=\int_0^\infty \mu_e(r+\hat{u}_k l)dl, \quad (13a)$$

$$I_{f,k}(r)=\int_0^\infty \mu_f(r+\hat{u}_k l)dl. \quad (13b)$$

Notably, the data function $\emptyset_{kl}(r)$ is not symmetric with respect to the interchange of the indexes k and l. Physically, this means that the measurements do not obey reciprocity under the interchange of the source and the detector. The lack of reciprocity follows from the spectral dependence of the attenuation, that is, from $\mu_e(r) \neq \mu_f(r)$. This is different from the star transform that arises in single-scattering tomography, in which the data function is symmetric. In the case considered here, the lack of symmetry of the data function allows a local reconstruction algorithm to be derived which yields all three functions $\mu_e(r)$, $\mu_f(r)$ and $\tilde{n}(r)$. Let us consider the symmetric and anti-symmetric linear combinations of the data, $$\phi_{kl}^{(+)}(r) = \tfrac{1}{2}[\phi_{kl}(r)+\phi_{lk}(r)], \phi_{kl}^{(-)}(r)=\phi_{kl}(r)-\phi_{lk}(r). \quad (14)$$

It should be noted that measuring these linear combinations requires reversing the path of the photon. In embodiments of the present invention, this is achieved by physically interchanging the source and detector for each broken ray or, alternatively, performing an additional scan with interchanged source and detector arrays. Accordingly, in embodiments of the present invention, the controller 301 is configured to record information indicative of the intensity of the electromagnetic radiation while the source 110, 210 is in a first position and the detector 120a, 120b, 220a, 220b is in a second position. Then, the source and detector positions are interchanged such that the source 110, 210 is in the second position and the detector 120a, 120b, 220a, 220b is in the first position, and the controller 301 proceeds to record information indicative of an intensity of the electromagnetic radiation for the new combination of source and detector positions.

Depending on the embodiment, the source 110, 210 and detectors 120a, 120b, 220a, 220b may be automatically repositioned by the controller 301 using the source and detector positioning mechanisms 310, 320, or the source 110, 210 and detectors 120a, 120b, 220a, 220b may be manually repositioned. When a plurality of detectors 120a, 120b, 220a, 220b are used, the source position may be interchanged with each one of the plurality of detector positions. In some embodiments, the controller 301 may obtain intensity data from the at least one detector for all combinations of source and detector positions at the vertex currently under observation, before returning the source to its original position and then moving the detectors to new detector positions 121, 221 to observe another vertex within the current slice. Once data has been captured for all vertices within the current slice, the source 110, 210 and detectors 120a, 120b, 220a, 220b may be synchronously moved to new source and detector positions 111, 211, 121, 221 as described above, and the process repeated to obtain data for a slice containing the new source position.

From equations (12) and (14), the following set of linear equations can be obtained:

$$I_k^{(+)}(r)+I_l^{(+)}(r)+\xi(r)=\phi_{kl}^{(+)}(r), \quad (15a)$$

$$I_k^{(-)}(r)-I_l^{(-)}(r)=\phi_{kl}^{(-)}(r). \quad (15b)$$

where $$i_k^{(+)}(r)=\int_0^\infty \bar{\mu}(r+u_k l)dl, \quad (16a)$$

$$I_k^{(-)}(r)=\int_0^\infty \Delta(r+\hat{u}_k l)dl, \quad (16b)$$

and $$\bar{\mu}(r)=\tfrac{1}{2}[\mu_e(r)+\mu_f(r)]. \quad (17a)$$

$$\Delta(r)=\mu_e(r)-\mu_f(r). \quad (17b)$$

Inversion with Complete Data

In this section, we show how all three functions of interest (the background attenuation coefficients at the excitation and fluorescence frequencies and the concentration of fluorophore) can be reconstructed stably and separately by accounting for the BRT non-reciprocity. Explicit image reconstruction formulas are also derived, based on the assumption that a complete set of data is available.

As mentioned above, the data functions $\emptyset_{kl}(r)$ or $\emptyset_{kl}^{(\pm)}(r)$ are defined only for positions of the vertex r such that $\tilde{n}(r)>0$. Otherwise, the data function cannot be measured. In practice, the condition that the data is measurable is stronger and reads $\tilde{n}(r) \geq \tilde{n}_{min}(r)>0$. Here $\tilde{n}_{min}(r)$ is experimentally determined.

The above considerations are illustrated in FIG. 6. Let $\Sigma \subset \Omega$ be the region in $\Omega$ in which the fluorescence signal can be measured. $\Sigma$ can be defined with or without reference to $\tilde{n}_{min}(r)$; in an experiment, $\Sigma$ is the set of all vertex positions for which the fluorescence signal is well above the noise level. In FIG. 6, $\Sigma$ is shown as a simple connected region, but more complex geometries can be considered in other embodiments of the present invention. If $\Sigma=\Omega$, the fluorescence signal can be measured in the whole domain of interest. We say that in this case we have access to complete data. In optical tomography, this situation occurs when a significant concentration of the fluorescent molecules are present everywhere in $\Omega$.

In this section, we discuss inversion of equations (16a) and (16b) with complete data. Then, in the next section we consider approaches to reconstruction in cases when complete data are not available. We begin by noting that equation (16a) is equivalent to the star transform of a medium with the attenuation coefficient $\bar{\mu}(r)$. In an optical tomography embodiment, the dimensionless concentration of fluorophores $\tilde{n}(r)$ can be considered mathematically equivalent to the scattering coefficient in an x-ray embodiment. It is therefore possible to simultaneously reconstruct $\bar{\mu}(r)$ and $\xi(r)$. The dimensionless concentration can then be trivially computed as $\tilde{n}(r)=\exp(-\xi(r))$.

By considering the three-ray geometry shown in FIG. 5, the vector coefficients $a_{kl}(k, l=1, 2, 3)$ can then be defined as shown in the matrix $$\begin{bmatrix} 0 & \sigma_1\hat{u}_1+\sigma_2\hat{u}_2 & \sigma_1\hat{u}_1+\sigma_3\hat{u}_3 \\ \sigma_1\hat{u}_1+\sigma_2\hat{u}_2 & 0 & \sigma_2\hat{u}_2+\sigma_3\hat{u}_2 \\ \sigma_1\hat{u}_1+\sigma_3\hat{u}_3 & \sigma_2\hat{u}_2+\sigma_3\hat{u}_2 & 0 \end{bmatrix}. \quad (18)$$

Here the scalar coefficients $\sigma_k$ satisfy the condition $$\sigma_1\hat{u}_1+\sigma_2\hat{u}_2+\sigma_3\hat{u}_3=0. \quad (19)$$

Such coefficients can always be found, since three vectors on a plane cannot be linearly-independent. We then take the following linear combination of the symmetric functions $\emptyset_{kl}^{(+)}(r)$ relating to the sum of the intensities of the electromagnetic radiation detected by the detectors 120a, 120b, 220a, 220b (by symmetry, we mean here the property $\emptyset_{kl}^{(+)} = \emptyset_{lk}^{(+)}$):

$$\Phi^{(+)}(r) = \frac{1}{2} \sum_{k,l=1}^{3} a_{kl} \phi_{kl}^{(+)}(r). \quad (20)$$

From equation (20), it can be seen that the resulting function $\Phi^{(+)}(r)$ satisfies $$\sum_{k=1}^{3} \sigma_k \hat{u}_k I_k^{(+)}(r) = \Phi^{(+)}(r). \quad (21)$$

We now use the property $-\nabla \cdot u_k I_k^{(+)}(r) = \bar{u}(r)$ to find that $$\bar{\mu}(r) = -\frac{1}{\sigma_1 + \sigma_2 + \sigma_3} \nabla \cdot \Phi^{(+)}(r). \quad (22)$$

In the present embodiment, a three-ray geometry is used and accordingly the denominator is of the form $\sigma_1 + \sigma_2 + \sigma_3$, where $\sigma_1$, $\sigma_2$, $\sigma_3$ are predefined quantities in the form of scalar coefficients, as described above in relation to (18) and (19). It will be appreciated that when different source and detector geometries are used, a different size of matrix and a different number of scalar coefficients may be used. In general, in equation (22) the denominator may be any suitable predefined quantity relating to a geometric arrangement of the source and detector positions.

Thus, a local reconstruction formula is obtained for the spectrally-averaged attenuation coefficient $\bar{\mu} = (\mu_e + \mu_f)/2$. This formula utilizes the symmetric data functions $\emptyset_{kl}^{(+)}(r)$ or a linear combination thereof $\Phi^{(+)}(r)$, as defined in equation (20). Indeed, the symmetric data points are obtained by combining the measurements in which the photon travels through the medium in both possible directions (for a given broken ray). When the photon travels in one of these directions, it is attenuated at the rate $\mu_e$ in the first segment of the broken ray 141, 241 and $\mu_f$ in the second segment 142, 242. When the direction of propagation is reversed by interchanging the source and detector positions, the rate of attenuation is $\mu_f$ in the first segment 141, 241 and $\mu_e$ in the second segment 142, 242. In the present embodiment the controller 301 is configured to add together the two measurements taken before and after interchanging the source and detector positions. Adding together the two measurements in this way has the same effect as performing an average of the attenuation coefficient.

Since it has been assumed that complete data are available in the present case, it is possible to reconstruct $\bar{\mu}(r)$ everywhere in $\Omega$. The controller 301 can then use this result to compute the ray integrals $I_k^{(+)}(r)$ according to equation (16a). Once this is done, the controller 301 can obtain $\xi(r)$ by solving equation (15a). This procedure yields a complete reconstruction of $\tilde{n}(r)$. However, to obtain the spectrally-resolved intrinsic attenuation coefficients $\mu_e^{(0)}(r)$ and $\mu_f^{(0)}(r)$, the controller 301 also needs to know the spectral difference $\Delta(r)$ of the attenuation coefficients. The controller 301 may determine the spectral difference $\Delta(r)$ by using the anti-symmetric data functions $\emptyset_{kl}^{(-)}(r)$ to reconstruct $\Delta(r)$ by inverting equation (15b). Here, the latter equation is similar to the star transform given in equation (15a), but has a different sign and also does not contain the term $\xi(r)$. Therefore the process of inverting equation (15b) is slightly different to the process of inverting equation (15a), as described below.

In order to derive a local inversion formula for equation (15a), it is necessary to find a set of vector coefficients $a_{0l}$ that satisfy the following four conditions: (i) $a_{kl} = a_{lk}$; (ii) $a_{kk} = 0$; (iii) $\Sigma_l a_{kl} = \sigma_k \hat{u}_k$; and (iv) $\Sigma_{kl} a_{kl} = 0$. For the conditions (i) and (iv) to be consistent, the scalar coefficients $\sigma_k$ must satisfy $\Sigma_k \sigma_k \hat{u}_k = 0$. If the above four conditions hold, then $\frac{1}{2} \Sigma_{kl} a_{kl}(x_k + x_l + y) = \Sigma_k \sigma_k \hat{u}_k x_k$, where $x_k$ and $y$ are arbitrary numbers. This property allows the star transform (equation 15a) to be inverted locally.

In order to invert equation (15b), it is necessary to find a set of coefficients $b_{kl}$ such that $\frac{1}{2} \Sigma_{kl} b_{kl}(x_k - x_l) = \Sigma_k \sigma_k \hat{u}_k x_k$. It can be noted that $b_{kl}$ must satisfy only three conditions, namely, (i) $b_{kl} = -b_{lk}$; (ii) $b_{kk} = 0$; and (iii) $\Sigma_l b_{kl} = \sigma_k \hat{u}_k$. The condition (iv) $\Sigma_{kl} b_{kl} = 0$ also holds, but is a consequence of (i) rather than an independent condition. It also follows from (i) and (iii) that $\sigma_k$ must still satisfy $\Sigma_k \sigma_k \hat{u}_k = 0$. For the three-ray geometry considered here, as shown in FIG. 5, the following matrix of coefficients $b_{kl}$ satisfy all stated conditions:

$$\begin{bmatrix} 0 & -\sigma_1 \hat{u}_1 & 0 \\ \sigma_1 \hat{u}_1 & 0 & \sigma_3 \hat{u}_3 \\ 0 & -\sigma_3 \hat{u}_3 & 0 \end{bmatrix}. \quad (23)$$

The coefficients $\sigma_k$ in this matrix are the same as in matrix (18) and are determined from equation (19). Additionally, it can be noted that the matrix shown in (23) does not contain $\hat{u}_2$ explicitly but $\hat{u}_2$ is not linearly independent of $\hat{u}_1$ and $\hat{u}_3$. In fact, (23) is not a unique choice of coefficients; the conditions stated above for the elements $b_{kl}$ can be written equivalently as $b_{12} = b_{21} + \sigma_2 \hat{u}_2$ and $b_{13} + b_{23} = \sigma_3 \hat{u}_3$. In deriving (23), we have made the choice $b_{13} = 0$. However, an alternative solution would be to take $b_{23} = 0$, which results in the matrix $$\begin{bmatrix} 0 & \sigma_2 \hat{u}_2 & \sigma_3 \hat{u}_3 \\ -\sigma_2 \hat{u}_2 & 0 & 0 \\ -\sigma_3 \hat{u}_3 & 0 & 0 \end{bmatrix}. \quad (24)$$

There are other possible choices in which all six off-diagonal elements of the matrix are non-zero and all three vectors $\hat{u}_1$, $\hat{u}_2$ and $\hat{u}_3$ are explicitly present. This will restore the symmetry, which is seemingly lost in (23). Indeed, there is nothing special about the vector $\hat{u}_2$, which is not present explicitly in (23) or $\hat{u}_1$, which is not present in (24).

A linear combination of the anti-symmetric data functions relating to a difference between the intensities of the electromagnetic radiation detected by the detectors 120a, 120b, 220a, 220b is now defined according to $$\Phi^{(-)}(r) = \frac{1}{2} \sum_{k,l=1}^{3} b_{kl} \phi_{kl}^{(-)}(r). \quad (25)$$

For the matrix of coefficients defined in (23), or for any other such matrix with any choice for the two indices, the right-hand side of (25) is of the form $-\Sigma_k^3 \sigma_k \hat{u}_k I_k$. Therefore, (25) is inverted by taking the divergence. Based on this observation, we find is that the reconstruction formula for the spectral difference of the attenuation coefficients, which is of the form $$\Delta(r) = -\frac{1}{\sigma_1 + \sigma_2 + \sigma_3} \nabla \cdot \Phi^{(-)}(r) \qquad (26)$$

in complete analogy with (22). Direct reconstruction formulas have therefore been obtained for $\bar{\mu}(r)$, $\Delta(r)$ and $\xi(r)$. Similar to equation (22) described above, in embodiments in which a different source and detector geometry is used, the denominator in equation (26) may be any suitable predefined quantity relating to the geometric arrangement of the source and detector positions.

Based on these results, the controller 301 can easily obtain $\mu_e(r)$, $\mu_f(r)$ and $\tilde{n}(r)$ by using equations (17) and (11a). Additionally, if the controller 301 is provided with information about the absorption cross section and quantum efficiency of a single fluorophore, it is possible to compute the physical number density of the fluorescent molecules n(r) and, once the latter is known, the intrinsic attenuation coefficients of the medium $\mu^{(0)}(r)$ and $\mu_f^{(0)}(r)$ can be determined from equation (19). In this way, the controller 301 can be programmed with direct reconstruction formulas for all optical properties of the medium.

Inversion with Incomplete Data In some physical situations, complete data may not be available. In such cases, it may still be possible to reconstruct the total attenuation coefficients $\mu_e(r)$ and $\mu_f(r)$ for r ∈ Σ. To this end, the controller 301 may use equations (22) and (26) to find $\bar{\mu}(r)$ and $\Delta(r)$, since these equations are local and do not require complete data, and then use $\mu_e = \bar{\mu} + \frac{1}{2}\Delta$, and $\mu_f = \bar{\mu} - \frac{1}{2}\Delta$. For some applications this may provide sufficient information about the sample under investigation, in which case no further image reconstruction is necessary. However, it is not possible to find $\xi(r)$ from the above result in the absence of complete data, because the ray integrals $I_k^{(+)}(r)$ cannot be computed according to equation (16a). Consequently, it is not possible to obtain $\xi(r)$ from equation (15a).

One possible solution to this problem is to introduce some assumptions about the spectral dependence of the intrinsic attenuation. For example, we may know that $\mu_e^{(0)}(r)/\mu_f^{(0)}(r) = \kappa$, where κ is a position-independent constant which depends on the frequencies $\omega_e$ and $\omega_f$. Based on equation (3) and the above assumption, it can be shown that:

$$\kappa\mu_f^{(0)}(r) + \sigma_e n(r) = \mu_e(r), \mu_f^{(0)}(r) + \sigma_f n(r) = \mu_f(r), \qquad (27)$$

where the functions $\mu_e(r)$ and $\mu_f(r)$ are known in Σ. From this it can be shown that $$n(r) = \frac{\mu_e(r) - \kappa\mu_f(r)}{\sigma_e - \kappa\sigma_f}, \quad \mu_f^{(0)}(r) = \frac{\sigma_e\mu_f(r) - \sigma_f\mu_e(r)}{\sigma_e - \kappa\sigma_f}. \qquad (28)$$

The above condition on the spectral dependence is equivalent to the assumption that the medium contains two chemical species of molecules or macroscopic particles that are responsible for the attenuation, one of which is fluorescent (i.e. the dye) and the other of which is not (i.e. the material of the sample 130, 230 under investigation), and that the optical properties of the medium are fully described by two mathematically-independent density functions.

In samples with complex chemical and structural composition, the above assumption might not hold. Since different species of absorbers can have different optical spectra, the assumption) $\mu_e^{(0)}(r)/\mu_f^{(0)}(r) = \kappa$ may not be justified. In this case, additional spectral measurements could be employed to access the missing information. For instance, in the above description it has been assumed that the light recorded by the detectors 120a, 120b, 220a, 220b has passed through a spectral filter that eliminates light at the excitation frequency $\omega_e$. However, another approach is to employ spectrally-resolved detectors that can measure the light intensities at the excitation and fluorescence frequencies separately. Then, if the medium is weakly scattering, intensity measurements at the excitation frequency may be used to reconstruct $\mu_e(r)$ everywhere in Ω. This does not require an additional scan, only a spectrally-resolved measurement of intensity.

Finally, it is noted that knowledge of $\mu_e(r)$ everywhere in Ω is insufficient to reconstruct n(r), since it is also necessary to know $\mu_f(r)$ in Ω. However, this function can be recovered by performing an additional scan using $\omega_f$ as the excitation frequency, in other words, by using a second source configured to emit electromagnetic radiation at the second wavelength. Fluorescence in this case is not excited, and the signal at $\omega_f$ is due to single scattering. In this case, the ray integrals $I_k^{(+)}(r)$ can then be computed according to equation (16a), and it is possible to further solve for $\xi(r)$ just as in the case of complete data.

In summary, it has been shown in the foregoing description that the BRT is non-reciprocal if the photon can change its frequency at the vertex of the broken ray. The non-reciprocity provides an opportunity to gain additional information about the medium by interchanging the source and detector in each measurement. The image reconstruction methods described herein are direct and spatially-local.

Additionally, applications of non-reciprocity to tomographic optical imaging of a medium containing a fluorescent contrast agent have been described above. In this case, the quantities of interest are the number density of the fluorophores and the intrinsic attenuation coefficients of the medium at the excitation and fluorescence frequencies. All three functions can be reconstructed simultaneously and independently by inverting the three-ray star transform of the medium (consisting of three broken rays with a common vertex and some common edges, as shown in FIG. 5), assuming that a complete data set is available. Physically, this condition means that there is a significant concentration of the fluorescent agent in the region of interest. If this condition is not satisfied, alternative methods for performing reconstruction have also been described above, and a complete reconstruction is still possible with the use of additional spectrally-resolved measurements.

The formalism presented above does not make any assumption about the angles of the broken rays, except where applied to Compton scattering of x-rays. As a result, both backscattering and transmission measurement geometries can be implemented, as shown in FIGS. 1 and 2. The back-scattering measurement geometry, as shown in FIG. 2, is important for in vivo imaging of mesoscopic systems.

The above-described equations are applicable to single scattering x-ray tomography in which the photon energy changes due to Compton scattering, in which case complete data will almost always be available. In order to apply the reconstruction methods described in this paper to Compton scattering, it is important to use only broken rays with the same angle to guarantee that the Compton energy shifts are always the same. The symmetric three-ray star geometry satisfies this condition: all scattering angles in this case are equal to $2\pi/3$ (=120°). The formalism presented here enables a new approach to dual-energy x-ray tomography that could potentially overcome some of the limitations of conventional techniques due to hardware, software, or dose constraints. Indeed, for a Compton scattering angle of $2\pi/3$, the energy separation between the primary (excitation) and scattered radiation is helpful for improved tissue differentiation based on simultaneous reconstruction of tissue properties at two energies. At the same time, this method can be realized with single-energy exposure and single-energy detection. Moreover, the spectral distribution of the detected scattered radiation can be much narrower than that of the detected lower-energy radiation conventionally used in dual-energy computed tomography (CT). This could be useful for ameliorating the artefacts associated with beam hardening.

Whilst certain embodiments of the invention have been described herein with reference to the drawings, it will be understood that many variations and modifications will be possible without departing from the scope of the invention as defined in the accompanying claims.

The invention claimed is:

1. Apparatus for constructing a tomographic image of a sample, the apparatus comprising:
    at least one source configured to emit electromagnetic radiation at a first wavelength;
    at least one angularly-selective detector configured to detect the electromagnetic radiation at a second wavelength after the electromagnetic radiation has interacted with the sample; and
    a controller configured to:
        obtain information indicative of an intensity of the electromagnetic radiation detected at a second position by the at least one detector while the at least one source emits the electromagnetic radiation at a first position, and to obtain information indicative of an intensity of the electromagnetic radiation detected by the at least one detector after the source and detector positions are interchanged such that the electromagnetic radiation is emitted from the second position and detected at the first position, wherein said information is obtained for each one of a plurality of vertices within the sample,
        determine, for each one of the plurality of vertices within the sample, a first coefficient relating to an attenuation of the electromagnetic radiation at said vertex in the sample at the first wavelength, a second coefficient relating to an attenuation of the electromagnetic radiation at said vertex in the sample at the second wavelength, and a third coefficient relating to a material property at said vertex that influences the intensity of the electromagnetic radiation measured by the at least one detector, based on said obtained information, and
        construct a tomographic image of the sample based on the determined first, second and third coefficients for the plurality of vertices.

2. The apparatus of claim 1, wherein the apparatus is configured to interchange the source and detector positions by physically moving the at least one source and the at least one detector.

3. The apparatus of claim 1, wherein the at least one source comprises a first source arranged to emit the electromagnetic radiation from the first position and a second source arranged to emit the electromagnetic radiation from the second position, and
    wherein the apparatus is configured to interchange the source and detector positions by controlling the first source to stop emitting electromagnetic radiation and controlling the second source to start emitting electromagnetic radiation.

4. The apparatus of claim 1, wherein the first wavelength is an x-ray wavelength and the third coefficient is a scattering coefficient related to an electron density of the sample at the respective one of the plurality of vertices.

5. The apparatus of claim 4, wherein the at least one detector is arranged so as to detect the electromagnetic radiation at an angle of about 120 degrees relative to a direction in which the electromagnetic radiation is emitted by the at least one source.

6. The apparatus of claim 5, wherein the at least one detector comprises:
    a first detector arranged so as to detect the electromagnetic radiation at an angle of about 120 degrees relative to the direction in which the electromagnetic radiation is emitted by the at least one source; and
    a second detector arranged so as to detect the electromagnetic radiation at an angle of about 120 degrees relative to the direction in which the electromagnetic radiation is emitted by the source, and at an angle of about 120 degrees relative to the angle at which the first detector is arranged to detect the electromagnetic radiation.

7. The apparatus of claim 1, wherein the first wavelength is an optical wavelength and the third coefficient is related to a concentration of a fluorescent dye at the respective one of the plurality of vertices.

8. The apparatus of claim 1, wherein the controller is configured to cause the tomographic image to be displayed on a display.

9. The apparatus of claim 8, comprising:
    the display, configured to receive the tomographic image from the controller and display the tomographic image.

10. The apparatus of claim 1, comprising:
    a source positioning mechanism for automatically moving the at least one source between a plurality of source positions; and
    a detector positioning mechanism for automatically moving the at least one detector between a plurality of detector positions.

11. The apparatus of claim 10, wherein the apparatus is configured to interchange the source and detector positions by physically moving the at least one source and the at least one detector, and wherein after obtaining the information indicative of an intensity of the electromagnetic radiation detected at the second position by the at least one detector while the electromagnetic radiation is emitted from the first position, the controller is configured to control the source and detector positioning mechanisms to interchange the positions of the source and at least one detector, and then obtain the information indicative of an intensity of the electromagnetic radiation detected at the first position by the at least one detector while the electromagnetic radiation is emitted from the second position.

12. The apparatus of claim 10, wherein the at least one source is configured to emit the electromagnetic radiation along a first axis, and
    wherein the controller is configured to obtain the information indicative of the intensity of the electromagnetic radiation detected by the at least one detector for a slice through the sample by:
        controlling the detector positioning mechanism to scan the at least one detectors along a second axis at an angle with respect to the first axis; and controlling the detector positioning mechanism to scan the at least one detectors along a third axis at an angle with respect to the first and second axes.

13. The apparatus of claim 12, wherein the tomographic image is a three-dimensional image of the sample, and
wherein the controller is configured to obtain the information indicative of the intensity of the electromagnetic radiation detected by the at least one detector for a plurality of slices by:
controlling the source positioning mechanism to move the at least one source to a new source position offset from the first axis on which electromagnetic radiation was emitted at the previous source position;
controlling the detector positioning mechanism to scan the at least one detectors along the first and second axes so as to obtain said information for a new slice containing the new source position; and
repeating said steps of controlling the source and detector positioning mechanisms to obtain said information for the plurality of slices.

14. The apparatus of claim 1, wherein the controller is configured to determine the first coefficient, $\mu_e(r)$, and the second coefficient, $\mu_f(r)$, based on solving the simultaneous equations:

$$\mu(r) = \frac{1}{2}[\mu_e(r) + \mu_f(r)]$$

$$\Delta(r) = \mu_e(r) - \mu_f(r)$$

where $$\overline{\mu}(r) = -\frac{1}{\sigma}\nabla \cdot \Phi^{(+)}(r)$$

and $$\Delta(r) = -\frac{1}{\sigma}\nabla \cdot \Phi^{(-)}(r)$$

where $\Phi^{(+)}(r)$ is a linear combination of symmetric data functions relating to a sum of the intensities of the electromagnetic radiation detected by the at least one detector, $\Phi^{(-)}(r)$ is a linear combination of anti-symmetric data functions relating to a difference between the intensities of the electromagnetic radiation detected by the at least one detector, and $\sigma$ is a predefined quantity relating to a geometric arrangement of the source and detector positions, and
wherein the controller is configured to determine the third coefficient $\xi(r)$ based on the equations:

$$I_k^{(+)}(r) + I_l^{(+)}(r) + \xi(r) = \phi_{kl}^{(+)}(r)$$

where $$I_k^{(+)}(r) = \int_0^\infty \overline{\mu}(r + \hat{u}_k l) dl$$

and wherein $\phi_{kl}^{(+)}(r)$ are symmetric data functions relating to the sum of the intensities of the electromagnetic radiation detected by the at least one detector.

15. A method of constructing a tomographic image of a sample using apparatus comprising at least one source configured to emit electromagnetic radiation at a first wavelength, and at least one angularly-selective detector configured to detect the electromagnetic radiation at a second wavelength after the electromagnetic radiation has interacted with the sample, the method comprising:
obtaining information indicative of an intensity of electromagnetic radiation detected at a second position by at least one detector while at least one source emits the electromagnetic radiation at a first position, for each one of a plurality of vertices within the sample;
obtaining information indicative of an intensity of the electromagnetic radiation detected by the at least one detector after the source and detector positions are interchanged such that the electromagnetic radiation is emitted from the second position and detected at the first position, for each one of the plurality of vertices within the sample;
determining, for each one of the plurality of vertices within the sample, a first coefficient relating to an attenuation of the electromagnetic radiation at said vertex in the sample at the first wavelength, a second coefficient relating to an attenuation of the electromagnetic radiation at said vertex in the sample at the second wavelength, and a third coefficient relating to a material property at said vertex that influences the intensity of the electromagnetic radiation measured by the at least one detector, based on said obtained information; and
constructing a tomographic image of the sample based on the determined first, second and third coefficients.

16. The method of claim 15, comprising:
interchanging the source and detector positions by physically moving the at least one source and the at least one detector.

17. The method of claim 15, wherein the at least one source comprises a first source arranged to emit the electromagnetic radiation from the first position and a second source arranged to emit the electromagnetic radiation from the second position, the method comprising:
interchanging the source and detector positions by controlling the first source to stop emitting electromagnetic radiation and controlling the second source to start emitting electromagnetic radiation.

18. The apparatus of claim 15, wherein the first wavelength is an x-ray wavelength and the third coefficient is a scattering coefficient related to an electron density of the sample at the respective one of the plurality of vertices.

19. A computer program comprising software instructions which, when executed, cause performance of a method according to claim 15.

20. A non-transitory computer-readable medium arranged to store a computer program according to claim 19.

* * * * *